G. D. McCLURE.
Stalk-Chopper.
No. 53,848. Patented Apr. 10, 1866.
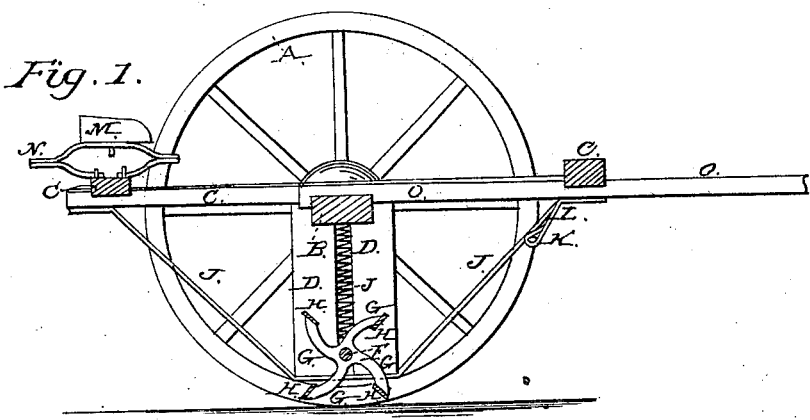
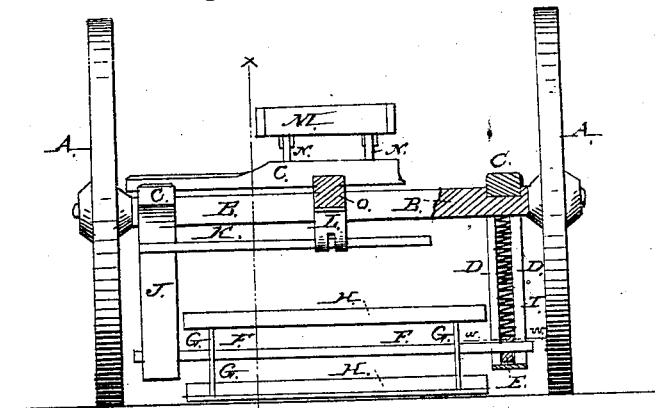
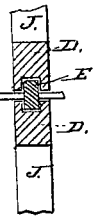
Witnesses:
Inventor:
George D. McClure
Per Munn & Co.
Attys

UNITED STATES PATENT OFFICE.

GEORGE D. McCLURE, OF DENVER STATION, ILLINOIS.

IMPROVEMENT IN CORNSTALK-CUTTERS.

Specification forming part of Letters Patent No. 53,848, dated April 10, 1866.

*To all whom it may concern:*

Be it known that I, GEORGE D. MCCLURE, of Denver Station, in the county of Hancock and State of Illinois, have invented a new and useful Improvement in Cornstalk-Cutters; and I do hereby declare that the following is a full, clear, and exact description thereof, which will enable others skilled in the art to make and use the same, reference being had to the accompanying drawings, forming a part of this specification, in which—

Figure 1 is a vertical section of my improved cornstalk-cutter, taken through the line *x x*, Fig. 2. Fig. 2 is a front view, partly in section, of the same. Fig. 3 is a detail sectional view taken through the line *w w*, Fig. 2.

Similar letters of reference indicate like parts.

My invention has for its object to furnish a machine by means of which cornstalks may be cut into pieces of such a length that they will not interfere with plowing the land or with other agricultural operations, and which will do its work thoroughly and expeditiously whether the cornstalks are erect or prostrate; and it consists of a cornstalk-cutter constructed and arranged as hereinafter more fully described.

A are the wheels upon which the machine is supported and carried. B is the axle to which the frame C of the machine is attached.

To the frame C and axle B are attached arms or studs D, extending downward nearly to the ground and having vertical slots formed within them, as shown in the drawings. In the lower end of these slots are placed the bearings E, in which the cutter-shaft F revolves. To this shaft F are attached series of radial arms, G. The number of series will depend upon the length of the shaft F. They must be numerous enough to fully support the cutter-bars while doing their work. The arms G of the several series must be parallel with each other, and to the ends of the bars of each horizontal row are attached cutter-bars H.

The bearings E of the shaft F slide in the lower part of the slots in the arms D and are held down to their places by coiled-wire springs I. The upper ends of the springs I rest against the lower side of the axle B or against suitable supports placed in the upper parts of the said slots, while their lower ends rest against the bearings E.

The length of the radial arms G and of the arms or studs D should be so arranged that as the machine advances the cutter-bars may come in contact with the ground, cutting off the cornstalks that may come between them and the ground, and sinking into it when it is soft; but when the ground is harder the elasticity of the springs I allows the shaft F to be lifted up by the cutter-bars coming in contact with the ground.

J are braces passing from the front of the frame C down to the lower end of the arms D, and thence up to the rear part of the frame C, as shown in Fig. 1.

K is a bar extending across the front of the machine at a suitable height above the ground, and supported by having its ends attached to the braces J, as shown in Fig. 2, the intermediate part being sustained by a hanging support, L, descending from the frame, as shown in Figs. 1 and 2. The object of this bar K is to strike against and bend over the erect cornstalks, so that they may be acted upon by the cutters more advantageously.

M is the driver's seat, which may be attached to the frame C by springs N, as shown in the drawings.

For convenience in transporting the machine from one place to another, a lever may be placed near the driver's seat, to be operated by the foot of the driver, and connected by rods with the shaft F, so that the said shaft may be raised far enough to allow the cutter to be moved from one place to another without the cutter-bars H coming in contact with the ground.

O is the tongue, which is attached to the axle B and frame C, as shown in Fig. 1.

I claim as new and desire to secure by Letters Patent—

An improved cornstalk-cutter constructed and arranged substantially as described, and for the purpose set forth.

GEORGE D. McCLURE.

Witnesses:
JAMES McCLURE,
JAMES N. LESLIE.